Jan. 3, 1939.  G. LIEB ET AL  2,142,856
METHOD OF AND APPARATUS FOR REFRIGERATION
Filed June 23, 1934
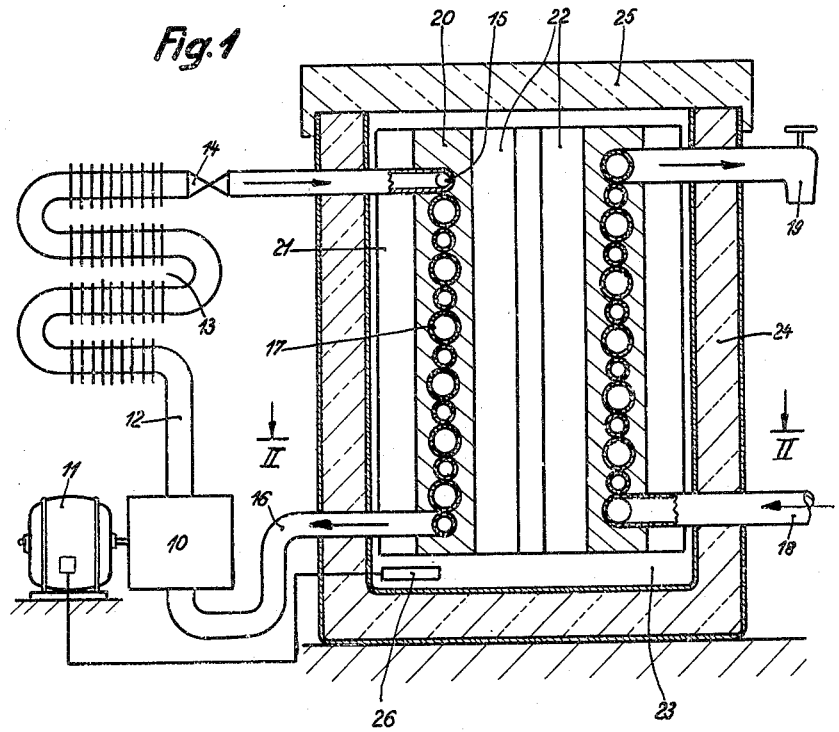
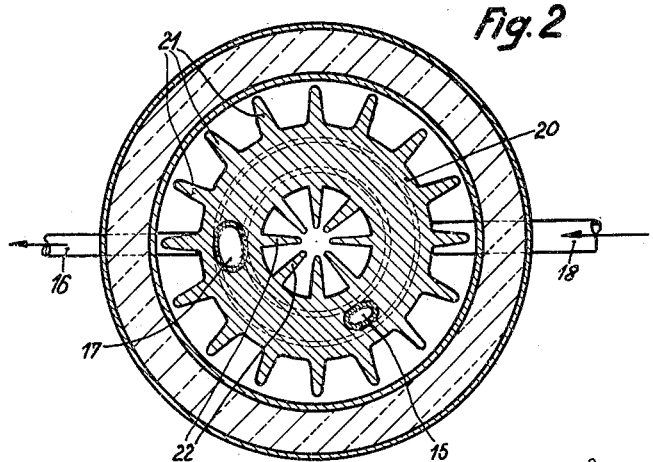
Inventors
Gustav Lieb
Ernst Rogowski
by Steward & McKay
their attorneys Patented Jan. 3, 1939

2,142,856

UNITED STATES PATENT OFFICE 2,142,856

METHOD OF AND APPARATUS FOR REFRIGERATION

Gustav Lieb and Ernst Rogowski, Stuttgart, Germany, assignors to Robert Bosch Gesellschaft mit beschränkter Haftung Application June 23, 1934, Serial No. 732,171
In Germany June 24, 1933

10 Claims. (Cl. 62—95)

The present invention relates to a method of refrigeration and to a refrigerating apparatus, intended more particularly for cooling beverages, in which a cold-storing medium is employed which is brought by the evaporating refrigerating medium to a low temperature, and in its turn—even after the stopping of the mechanical refrigeration—withdraws heat from the material to be cooled.

Refrigerating apparatus using brine as the cold-storing medium has the drawback that the brine must assume a very low temperature to store up sufficient cold, so that it is not suitable for cooling beverages. With a relatively high brine temperature, say 4 to 5° C. as is necessary for cooling beverages, the cold-storing capacity is poor, and the refrigerating machine must be frequently put into and out of operation. Water and ice as a cold-storing medium has the drawback that the freezing point is too low, and that the body of water used expands on becoming solid.

The present invention avoids the foregoing disadvantages by employing a liquid that freezes above 0° C., but not substantially above 10° C., as the cold-storing medium. The evaporating refrigerating medium then withdraws heat from the cold-storing medium until the latter is converted into a solid aggregate condition. On stopping the refrigerating machine, the cold-storing medium takes up heat from the articles or medium to be cooled until it again passes into the liquid condition. The latent heat of fusion or liquefaction of the cold-storing medium thus determines the cold-storing capacity. Pure benzol, which has a freezing point above 0° C. has been found a particularly suitable substance for use as the cold storing medium for the cooling of beverages.

An apparatus for cooling beer is shown by way of example in the accompanying drawing, in which:—

Figure 1 is a diagrammatic view of a cooling plant in vertical section.

Figure 2 is a horizontal section on the line II—II in Fig. 1.

From a compressor 10, which is driven by an electric motor 11, compressed refrigerating medium in vapor form flows through a pressure pipe 12 into a condenser 13 in which it is liquefied, and from that condenser the liquid flows through a controlling valve 14 into an evaporator coil 15. The evaporated refrigerating medium is again conveyed into the compressor 10 through the suction pipe 16. Between the separate convolutions of the evaporator coil, tubular coils 17 are disposed, into and through which the beer to be cooled flows from a supply pipe 18 to faucet 19 for drawing off the beer. The pipes 15 and 17 for the refrigerating medium and the beer respectively are embedded in a metal cylinder 20, which is provided internally and externally with projecting ribs 21 and 22. The whole is placed in a space or chamber 23, which is surrounded by an insulating casing 24, the container unit thus provided being closed by a removable cover 25. The space 23 is filled with benzol, which serves as the cold-storing medium, and in normal working, that is to say, when beer is being frequently drawn off, is in the solid form. When only a little beer is drawn off and consequently the need for refrigeration is comparatively small, the refrigerating machine is stopped, and the beer flowing through the coil 17 gives up heat to the solid cold-storing medium, but at the same time cannot become colder than 5° C. the melting point of the benzol, so that it can never acquire a low temperature which would be prejudicial to beer, the particular beverage being cooled in this illustrative example. Since the heat absorbing capacity of the solid benzol, or, as it may here be expressed for purposes of explaining the present invention, the supply of cold stored up in the solid benzol, is as large as the amount of heat required to change it from the solid to the liquid state, or the latent heat of fusion of the benzol multiplied by the weight of the benzol contained in the chamber 23, since as the latent heat of fusion or liquefaction of the benzol is comparatively high, the supply of cold is correspondingly large. The benzol in the solid aggregate condition has thus the advantage belonging to brine as a cold-storing medium of large storage capacity, but has not its drawback at lower temperatures. The metal cylinder 20 serves also for increasing the storage action, as do the ribs 21, 22, which ribs also serve at the same time for conducting the heat quickly to all parts of the frozen benzol core. If so much heat is absorbed by the benzol that it begins to melt, and the temperature tends to rise above the melting point, a thermostat 26 comes into action and switches on the electric motor 11, so that refrigerating medium flows through the evaporator coils 15. When the cold-storing liquid again becomes solid, the thermostat again cuts out the electric motor 11.

We declare that what we claim is:

1. A method of refrigeration employing as a heat-absorbing or cold-storing medium substantially pure benzol, said method comprising evaporating a volatile refrigerating medium in heat-exchange relation with a confined body of said benzol in liquid state until the same has been transformed to the solid state, and exposing material to be refrigerated at an initial temperature above said freezing point of said benzol to heat-exchange relation with the solid body of said benzol.

2. A method of refrigeration employing as a heat-absorbing or cold-storing medium substantially pure benzol, said method comprising evaporating a volatile refrigerating medium in heat-exchange relation with a confined body of said benzol in liquid state until the same is transformed to the solid state, then discontinuing said evaporation of said refrigerating medium in heat-exchange relation with said body, exposing material to be refrigerated at an initial temperature above said freezing point of said benzol to heat-exchange relation with the solid body of said benzol, and as the refrigeration proceeds intermittently resuming said evaporation of said refrigerating medium in heat-exchange relation with said body of said benzol to transform the same from the liquid back to the solid state as said benzol becomes liquid by absorption of heat from said object undergoing refrigeration.

3. A method of refrigerating a material to a temperature above the freezing point of water which comprises providing, as a heat-absorbing or cold-storing medium, a frozen body of substantially pure benzol, and exposing the material to be refrigerated at an initial temperature above the freezing point of benzol in heat-exchange relation with said frozen body for a sufficient length of time to effect refrigeration of said material.

4. The method of refrigerating a material to a desired low temperature somewhat above the freezing point of water, which comprises subjecting said material, together with a separately confined body of a cold-storing medium in heat-exchange relation therewith, to the refrigerating influence of a circulated refrigerant, said cold-storing medium being a substance of definite chemical composition having a freezing point above 0° C. but not substantially above 10° C., discontinuing the circulation of said refrigerant when said body of cold-storing medium is frozen, permitting the desired low temperature of said material to be maintained by heat-transfer between it and the frozen cold-storing medium, and resuming the circulation upon melting of said cold-storing medium.

5. The method of refrigerating a beverage to a desired low temperature somewhat above its freezing point and also that of water, which comprises subjecting said beverage, together with a separately confined body of a cold-storing medium in heat-exchange relation therewith, to the refrigerating influence of a circulated refrigerant, said cold-storing medium being a substance of definite chemical composition freezing in the neighborhood of 4° to 5° C., discontinuing the circulation of said refrigerant when said body of cold-storing medium is frozen, and resuming the circulation upon melting of said cold-storing medium.

6. The method of refrigerating a beverage which comprises cooling it to a desired low temperature somewhat above its freezing point and also that of water, in heat-exchange relation with a separately confined body of benzol serving as a cold-storing medium, by circulating a refrigerant in heat-transferring relation with both said beverage and said body of benzol, discontinuing such circulation when said body of benzol is frozen, and resuming the circulation upon melting of said benzol.

7. Refrigerating apparatus comprising a container unit, a confined body of a cold-storing medium therein consisting of a substance of definite chemical composition freezing at a temperature above 0° C. but not substantially higher than 10° C., means for maintaining in heat-exchange relation with said body the material to be refrigerated, means for circulating a refrigerant in heat-exchange relation with said body of cold-storing medium and operative to freeze the same, and means for stopping or starting such refrigerant circulation according as said cold-storing medium is frozen solid or is melting.

8. Refrigerating apparatus comprising a container unit, a confined body of benzol therein, means for maintaining in heat-exchange relation with said body of benzol material to be refrigerated, means for circulating a refrigerant in heat-exchange relation with said body of benzol and operative to freeze the same, and means for stopping or starting such refrigerant circulation according as said benzol is frozen or is melting.

9. Refrigerating apparatus as defined in claim 7, including thermostatic control means arranged to be affected by the condition of said cold-storing medium and thereby to stop and start the refrigerant circulation.

10. Refrigerating apparatus as defined in claim 8, including thermostat control means arranged to be affected by the condition of said cold-storing means and thereby to stop and start the refrigerant circulation.

GUSTAV LIEB.
ERNST ROGOWSKI.